United States Patent Office 3,629,178
Patented Dec. 21, 1971

3,629,178
PROCESS FOR INCREASING THE WET STRENGTH
OF CELLULOSIC MATERIALS
Donald E. Jefferson, Sykesville, and Nelson S. Marans, Silver Spring, Md., assignors to W. R. Grace & Co., New York, N.Y.
No Drawing. Filed Oct. 2, 1969, Ser. No. 863,366
Int. Cl. C08g 9/28, 37/30
U.S. Cl. 260—29.4 R                     1 Claim

ABSTRACT OF THE DISCLOSURE

This invention is directed to a resin solution useful for increasing the wet strength of cellulosic material, said solution being prepared by: (a) admixing over a period of about 0.1–15 minutes dicyandiamide, nitrilotriacetonitrile, and an alkali metal hydroxide in an inert liquid medium; (b) maintaining the resulting mixture at about 50–100° C. for about 10–600 minutes to form a solid condensation product; (c) separating the solid condensation product and reacting it with formaldehyde in a mixture of water and a monohydric alcohol having 1–4 carbon atoms to form the resin solution; and (d) recovering the resin solution.

This invention is also directed to the preparation and use of said resin solution and to a composition of matter comprising cellulosic material which has been treated with resin.

BACKGROUND OF THE INVENTION

This invention is in the field of cellulose chemistry—being a method and composition for increasing the wet strength of cellulosic materials.

A resin suitable for increasing the wet strength of cellulosic material and its use for this purpose is described in U.S. Pat. 2,900,367, Suen et al.

Wet strength of paper and paperboard and methods for increasing such strength is reviewed in "Wet Strength in Paper and Paperboard," Tappi Monograph Series No. 29, Technical Association of the Pulp and Paper Industry, New York, N.Y., copyright 1965.

SUMMARY OF THE INVENTION

In summary, this invention is directed to a process for preparing a resin solution useful for increasing the wet strength of cellulosic material, comprising:

(a) Admixing over a period of about 0.1–15 minutes dicyandiamide, nitrilotriacetonitrile, and an alkali metal hydroxide (e.g., LiOH, NaOH, or KOH) in an inert liquid medium (e.g., lower dialkyl ether in which the two lower alkyl groups are the same or different) of a glycol having about 2–66 carbon atoms, a lower monoalkyl ether of such glycol, tetrahydrofuran, dimethyl sulfoxide, dimethylformamide, N-methylpyrrolidone, or the like); or a mixture of at least two of such liquids, or a mixture of water and at least one such liquid;

(b) Maintaining the resulting mixture at about 50–100° C. for about 10–600 minutes to form a solid condensation product;

(c) Separating the solid condensation product (e.g., by filtration, decantation, or centrifugation) and reacting it with formaldehyde (preferably added as an aqueous solution analyzing about 25–50% HCHO) in a mixture of water and a monohydric alcohol (e.g., methyl alcohol, ethyl alcohol, a propyl alcohol, a butyl alcohol, or a mixture of at least two such alcohols) having 1–4 carbon atoms to form the resin solution; and (d) Recovering the resin solution.

DESCRIPTION OF PREFERRED EMBODIMENTS

In preferred embodiments of the process set forth in the above summary:

(1) The mole ratio of dicyandiamide:nitrilotriacetonitrile:alkali metal hydroxide is about 1:0.15–0.5:0.1–1;

(2) The weight ratio of alkali metal hydroxide to inert liquid medium is about 1:2–25;

(3) The inert liquid medium is a mixture of at least one inert organic liquid and water—the weight ratio of organic liquid:water being about 1:0.01–10 (more preferably about 1:0.5–5);

(4) The inert organic liquid medium is a member selected from the group consisting of ethylene glycol monomethyl ether, diethylene glycol dimethyl ether, ethylene glycol diethyl ether, tetrahydrofuran, dimethyl sulfoxide, dimethylformamide, N-methylpyrrolidone, a polyethylene glycol diether having the formula

$$R_1OCH_2CH_2(OCH_2CH_2)_nOR_2$$

where $R_1$ and $R_2$ are lower alkyl groups and $n$ is 1 to about 20, polypropylene glycol diethers having the formula $R_1O(C_3H_6O)_nC_3H_6OR_2$ where $R_1$ and $R_2$ are lower alkyl groups and $n$ is 1 to about 20, and mixtures of at least two of said group members;

(5) The inert organic liquid medium is ethylene glycol monomethyl ether;

(6) The monohydric alcohol is methanol;

(7) The mole ratio of water to monohydric alcohol (in step (c) of said summary) is about 1:0.1–3; and (8) The weight ratio of solid condensation product to formaldehyde reactant, as HCHO, is about 1:0.2–2.

In another preferred embodiment ("Embodiment A"), this invention is directed to a process for increasing the wet strength of cellulosic material comprising:

(a) Admixing over a period of about 0.1–15 minutes dicyandiamide, nitrilotriacetonitrile, and an alkali metal hydroxide in an inert liquid medium of the type described supra;

(b) Maintaining the resulting mixture at about 50–100° C. for about 10–600 minutes to form a solid condensation product;

(c) Separating the solid condensation product and reacting it with formaldehyde in a mixture of water and a monohydric alcohol having 1–4 carbon atoms to form the resin solution;

(d) Forming a treating mixture by adjusting the pH of the resin solution to about 0–6 by adding a strong acid thereto;

(e) Applying the treating mixture to the cellulosic material to form a treated cellulosic product; and (f) Curing the treated cellulosic product by maintaining said product at about 30–120° C. for about 1–2000 minutes to increase the wet strength thereof. In especially preferred embodiments of Embodiment A, supra:

(1) The weight ratio, on a dry basis, of treating mixture to cellulosic material is about 1:10–500; and (2) The cellulosic material is a member selected from the group consisting of cellulosic paper (including paperboard), cellulosic cloth (including cloth made from cotton, linen, ramie, and regenerated cellulose including that prepared by the viscose and cupra-ammonium processes), and cellulosic fibers (including cotton and cotton linters, linen, ramie, and regenerated cellulose).

In another preferred embodiment ("Embodiment B"), this invention is directed to a resin solution useful for increasing the wet strength of cellulosic material, said solution being prepared by:

(a) Admixing over a period of about 0.1–15 minutes dicyandiamides, nitrilotriacetonitrile, and an alkali metal hydroxide in an inert liquid medium of the type described supra;

(b) Maintaining the resulting mixture at about 50–100° C. for about 10–600 minutes to form a solid condensation product;

(c) Separating the solid condensation product and reacting it with formaldehyde in a mixture of water and a monohydric alcohol having 1–4 carbon atoms to form the resin solution; and (d) Recovering the resin solution.

In another preferred embodiment ("Embodiment C"), this invention is directed to a composition of matter prepared by:

(a) Admixing over a period of about 0.1–15 minutes dicyandiamide, nitrilotriacetonitrile, and an alkali metal hydroxide in an inert liquid medium of the type described supra;

(b) Maintaining the resulting mixture at about 50–100° C. for about 10–600 minutes to form a solid condensation product;

(c) Separating the solid condensation product and reacting it with formaldehyde in a mixture of water and a monohydric alcohol having 1–4 carbon atoms to form a resin solution;

(d) Forming a treating mixture by adjusting the pH of the resin solution to about 0–6;

(e) Applying the treating mixture to the cellulosic material to form a treated cellulosic product; and (f) Curing the treated cellulosic product by maintaining it at about 30–120° C. for about 1–2000 minutes to form said composition of matter.

In an especially preferred embodiment of the composition described in Embodiment C, supra, the inert liquid consists essentially of water and an inert organic liquid.

DETAILED DESCRIPTION OF THE INVENTION

It is well known to those skilled in the art that the strength properties of untreated cellulosic materials are practically unchanged when such materials are wetted with aliphatic or aromatic hydrocarbons while wetting such materials with water usually substantially decreases their strength properties. For example, it has been reported that water reduces the strength of normal untreated papers to values of about 3–10% of their dry strength.

It is known that treating cellulosic materials including paper with certain resins such as polyamide-epichlorohydrin resins, melamine resins, urea-formaldehyde resins, and the like will increase the wet strength of such material. With respect to paper, it has been stated that any paper possessing a wet tensile strength of more than 15% of its dry tensile strength is a "wet strength paper." Such resins are often called "wet strength resins."

We have developed a resin which, when applied to a paper or other cellulosic material according to the general procedure set forth in this specification, will result in the treated cellulosic material having a wet strength of 30–80% of that of dry untreated cellulosic material.

Thus, our resin is a superior material for producing wet strength paper (or wet strength cellulosic materials), i.e., our resin is a superior wet strength resin.

We have found that it is critical that the admixing step (step (a) of the process described in the above summary) be conducted rapidly, i.e., within a period of about 15 minutes or less. If substantially complete mixing of the NTAN, dicyandiamide and alkali metal hydroxide is not attained within such period the resin solution recovered in step (d) of said summary is ineffective when used in our process for increasing the wet strength of cellulosic materials.

It has been found that the resin product recovered in step (d) of said summary does not contain detectable quantities of unreacted triazine moieties.

When water is present in the inert liquid medium of step (a) of the process described in said summary, the alkali metal hydroxide, or a portion thereof, is dissolved in said water. However, it is not necessary for water to be present. Likewise, it is not necessary for the water and the organic component to be soluble in each other. Excellent results have been obtained with a two phase liquid system—an aqueous phase and an organic phase.

The following specific examples illustrate the process of our invention.

Example I

Into a 500 milliliter, 3 neck flask, provided with a mechanically driven stirrer, a thermometer, and a reflux condenser were added 200 milliliters of Methyl Cellosolve (glycol monomethyl ether), and 5 milliliters of water; then 15.3 grams of potassium hydroxide, 51.5 grams of dicyandiamide, and 22.8 grams of nitrilotriacetonitrile (NTAN) were added while stirring the mixture in the flask to thoroughly admix the potassium hydroxide, dicyandiamide and NTAN reactants. The admixing was complete in about 1–2 minutes. The resulting mixture was heated to about 75–85° C. while stirring. The stirred mixture was maintained at this temperature for about 3 hours. During this time the mixture turned from clear yellow to cloudy white as the reaction product precipitated. After the aforesaid 3 hours the contents of the flask was cooled to about 25° C. and the solid reaction product was separated by filtration. The separated reaction product was washed with a small quantity (ca. 25 ml.) of Methyl Cellosolve. The washed solid product, after being dried (freed of Methyl Cellosolve) overnight at 100° C. and about 25 ml. of mercury absolute pressure, weighed 51.2 grams.

A 50 gram portion of the above-described solid product and 200 ml. of formaldehyde solution (35% aqueous solution) and 135 grams of methanol were added to a 3 neck resin kettle equipped with a thermometer, a reflux condenser, and a mechanically driven stirrer. The pH of the resulting solution which was about 10.7 was adjusted to about 9 by the addition of sulfuric acid. The thus formed reaction mixture was maintained at about 70–75° C. for about 2 hours while stirring. Then an additional 150 ml. of 37% aqueous formaldehyde solution was added and the mixture was stirred for about another hour while maintaining the temperature thereof at about 80–85° C. after which time a clear yellow solution existed in the resin kettle. (In other runs all of the formaldehyde was added in one portion (one increment) with excellent results.) The thus formed yellow solution was removed from the resin kettle and recovered. The volatile components of the thus recovered yellow solution were removed by evaporation on a rotary film evaporator at about 75° C. and 25 ml. of mercury absolute pressure (It is desirable that where concentrating the aforesaid yellow solution by vaporizing volatile components therefrom such vaporization be conducted at a temperature below about 90° C. because at temperatures above about 90° C. a solid material is precipitated from the solution, thereby lowering the yield of yellow resin syrup (Product No. 1, infra) prepared by the concentration step.). A thick yellow syrup weighing 114.7 grams was recovered and labeled "Product No. 1."

Example II

Five 10% solutions of "Product No. 1" were prepared by dissolving portions of said product in water. These 5 solutions were labeled "Solution A," "Solution B," "Solution C," "Solution D," and "Solution E." Solution A had a pH of 10.0. The pH of Solution B was adjusted to 5 by adding concentrated hydrochloric acid solution. In the same manner the pH's of Solution C, D, and E were adjusted to 3, 2, and 1, respectively.

Weighed strips of filter paper from the same lot were immersed in Solutions A, B, C, D, and E and then cured by maintaining the thus treated strips at about 100° C. for about 60 minutes. The thus treated and thus dried strips of filter paper were weighed, and it was found that about 0.01 gram of resin was taken up per gram of filter paper. The wet strengths of the thus treated filter papers and of a piece of untreated filter paper from the same lot were determined using the method of the American Society Testing Materials (ASTM Designation: D 829-48). At the same time the dry strength of a piece of untreated filter paper from the same lot was determined and found to be 12 pounds per inch. The results of these tests are reported in the following table.

WET STRENGTH OF FILTER PAPER

| Filter paper treated with: | Wet strength, pounds per inch [1] |
|---|---|
| Solution A | 0.2 |
| Solution B | 7.0 |
| Solution C | 8.0 |
| Solution D | 4.2 |
| Solution E | 5.9 |

[1] The wet strength of untreated filter paper from the same lot was 0.2 pound per inch, and the dry strength of untreated filter paper from the same lot was 12 pounds per inch.

The wet strength of cellulosic fabrics and fibers have also been increased substantially by treating such fabrics and fibers by the general procedure of Example II.

By "strong acid" is meant an acid having a $pK_a$ of about 3 or lower. Typical of such acids as the strong mineral acids including hydrochloric, sulfuric, phosphoric, phosphorous, and pyrophosphoric acids, and strong organic acids such as phtalic acid, picric acid, and the chloroacetic acids. Other strong acids will, as a result of the disclosure presented in this specification, be readily apparent to those skilled in the art.

By "inert liquid medium" is meant a medium which is liquid from about 10° C. to 100° C. at atmospheric pressure and which does not react with the intermediate product (the "resulting mixture" of step (b) of the above summary) which is formed by the reaction of NTAN and dicyandiamide in the presence of an alkali metal hydroxide, and is polar enough to form a homogeneous system. Such a description includes dialkyl ethers of ethylene and propylene monoglycols or polyglycols but excludes hydrocarbons such as heptane, benzene, toluene cyclohexane, and the like.

The term "percent" (%) as applied to the concentration of solutions means percent (parts per hundred) by weight.

We claim:
1. A resin solution useful for increasing the wet strength of cellulosic material, said solution being prepared by:
    (a) admixing over a period of about 0.1–15 minutes a mole ratio of 1 mole dicyandiamide to 0.10–0.5 mole nitrilotriacetonitrile to 0.1–1 mole of an alkali metal hydroxide in an inert liquid medium;
    (b) maintaining the resulting mixture at about 50–100° C. for about 10–600 minutes to form a solid condensation product;
    (c) separating the solid condensation product and reacting it with formaldehyde in a weight ratio of 1 part solid condensation product to 0.2–2 parts formaldehyde in a mixture of water and a monohydric alcohol having 1–4 carbon atoms to form the resin solution; and
    (d) recovering the resin solution.

References Cited
UNITED STATES PATENTS

| | | | |
|---|---|---|---|
| 2,652,375 | 9/1953 | Cordier et al | 260—17.3 |
| 2,653,143 | 9/1953 | De Benneville et al. | 260—67.7 |
| 2,684,366 | 7/1954 | Simmons | 260—249.9 |
| 2,732,325 | 1/1956 | Lindenfelser et al. | 154—121 |
| 2,735,850 | 2/1956 | Jones | 260—249.9 |
| 2,792,395 | 5/1957 | Thrower et al. | 260—249.9 |
| 2,857,382 | 10/1958 | De Benneville et al. | 260—249.9 |
| 2,899,406 | 8/1959 | De Benneville et al. | 260—47 |
| 3,330,830 | 7/1967 | Kaiser | 260—249.9 |
| 3,408,254 | 10/1968 | Greene et al. | 161—261 |
| 3,446,777 | 5/1969 | Emmons | 260—78.5 |

WILLIAM H. SHORT, Primary Examiner

R. J. KOCH, Assistant Examiner

U.S. Cl. X.R.

117—155 L, 161 LN; 260—17.3 R, 33.2 R, 33.4 R, 67.6 C, 72 R, 249.9